(12) United States Patent
Hurlen

(10) Patent No.: US 9,951,447 B2
(45) Date of Patent: *Apr. 24, 2018

(54) JACKET FOR A LENGTHY BODY

(71) Applicant: MORENOT AS, Sovik (NO)

(72) Inventor: Stig Hurlen, Brattvag (NO)

(73) Assignee: MORENOT AS, Sovik (NO)

( * ) Notice: Subject to any disclaimer, the term of this patent is extended or adjusted under 35 U.S.C. 154(b) by 249 days.

This patent is subject to a terminal disclaimer.

(21) Appl. No.: 14/930,422

(22) Filed: Nov. 2, 2015

(65) Prior Publication Data

US 2016/0115629 A1    Apr. 28, 2016

Related U.S. Application Data

(63) Continuation of application No. 14/008,048, filed as application No. PCT/NO2012/050048 on Mar. 22, 2012, now Pat. No. 9,175,426.

(30) Foreign Application Priority Data

Mar. 29, 2011  (NO) .................................. 20110482
Mar. 7, 2012   (NO) .................................. 20120261

(51) Int. Cl.
  *D04C 1/06*   (2006.01)
  *D07B 1/02*   (2006.01)
  *D07B 1/06*   (2006.01)
  *D04C 3/00*   (2006.01)
  *F16L 57/06*  (2006.01)
  (Continued)

(52) U.S. Cl.
CPC ................. *D04C 1/06* (2013.01); *D04C 3/00* (2013.01); *D07B 1/02* (2013.01); *D07B 1/06* (2013.01); *F16L 57/06* (2013.01); *D07B 1/147* (2013.01); *D07B 1/20* (2013.01); *D07B 2201/1096* (2013.01); *D07B 2201/209* (2013.01); *D07B 2201/2016* (2013.01); *D07B 2201/2092* (2013.01); *D07B 2201/2096* (2013.01); *D07B 2205/201* (2013.01); *D07B 2205/205* (2013.01); *D07B 2205/2014* (2013.01); *D07B 2205/2042* (2013.01); *D07B 2401/2075* (2013.01); *D07B 2501/2061* (2013.01)

(58) Field of Classification Search
CPC ... D04C 1/06; D04C 3/00; D07B 1/02; D07B 1/06; F16L 57/06
See application file for complete search history.

(56) References Cited

U.S. PATENT DOCUMENTS

| | | |
|---|---|---|
| 3,805,667 A | 4/1974 | Orser |
| 4,070,911 A | 1/1978 | Makin |
| 4,312,260 A | 1/1982 | Morieras |

(Continued)

FOREIGN PATENT DOCUMENTS

| | | |
|---|---|---|
| CN | 201000781 Y | 1/2008 |
| EP | 1700948 A2 | 9/2006 |

(Continued)

*Primary Examiner* — Shaun R Hurley
(74) *Attorney, Agent, or Firm* — Patterson & Sheridan, L.L.P.

(57) ABSTRACT

A jacket for a load-bearing, lengthy body, wherein the jacket is comprised of a plurality of braid elements which, when braided, enclose at least a portion of the lengthy body, and wherein the braid element is comprised of a braided ribbon. A method of forming the jacket is also described.

11 Claims, 6 Drawing Sheets

(51) Int. Cl.
   *D07B 1/14* (2006.01)
   *D07B 1/20* (2006.01)

(56) References Cited

U.S. PATENT DOCUMENTS

| | | |
|---|---|---|
| 4,640,178 A | 2/1987 | Kurzbock |
| 5,257,571 A | 11/1993 | Richardson |
| 6,099,961 A | 8/2000 | Del Vecchio et al. |
| 8,789,452 B1 | 7/2014 | Janardhan et al. |
| 9,175,426 B2 * | 11/2015 | Hurlen ............... D07B 1/02 |
| 2005/0082083 A1 | 4/2005 | Nolan |
| 2005/0204909 A1 | 9/2005 | Morissette et al. |
| 2006/0179812 A1 | 8/2006 | Clough et al. |
| 2006/0186172 A1 | 8/2006 | Klein et al. |
| 2009/0165637 A1 | 7/2009 | Bosman et al. |
| 2013/0247534 A1 | 9/2013 | Canedo Duarte da Rocha et al. |
| 2014/0057103 A1 | 2/2014 | Mozsgai et al. |
| 2014/0251484 A1 | 9/2014 | Kury |

FOREIGN PATENT DOCUMENTS

| | | |
|---|---|---|
| NO | 314459 B1 | 3/2003 |
| WO | 03054291 A1 | 7/2003 |
| WO | 2005019525 A1 | 3/2005 |

\* cited by examiner

JACKET FOR A LENGTHY BODY

CROSS-REFERENCE TO RELATED APPLICATIONS

This application is a continuation of U.S. patent application Ser. No. 14/008,048, filed Dec. 11, 2013, to issue on Nov. 3, 2015, as U.S. Pat. No. 9,175,426, which is the national phase of PCT/NO12/050048, filed Mar. 22, 2012, which claims foreign priority to NO 20110482 filed Mar. 29, 2011 and NO 20120261 filed Mar. 7, 2012. Each of the aforementioned related patent applications is herein incorporated by reference.

BACKGROUND OF THE INVENTION

Field of the Invention

The invention concerns a jacket enclosing a lengthy body. More particularly, the invention concerns a braided jacket enclosing a load-bearing, lengthy body, for example ropes and mooring equipment.

Description of the Related Art

Mooring equipment is subjected to large loads. Besides being load-bearing and exposed to tensile forces, the surface of the mooring equipment is exposed to filing, rubbing, strikes and cuts. Particles, such as sand, may penetrate into the mooring equipment if, for example, it is attached to an anchor lying on a seabed, and the particles may cause internal wear and tear. Mooring equipment is also exposed to buckling.

It is known that lengthy bodies, such as ropes, mooring equipment, electric cables, hoses and pipes, at least at an end portion thereof, may be provided with a protective jacket. This jacket may be braided, as shown in e.g. patent publications U.S. Pat. Nos. 4,312,260; 4,640,178 and 6,099,961. For braiding of the protective jacket, it is known to use braid elements of laid fibres. From patent publication NO 314459/WO03054291, it is known that the braid elements in the protective jacket is comprised of woven ribbons.

Patent publication EP 1700948 describes a braided protective jacket for a rope. The protective jacket comprises a plurality of braid elements comprised of threads. The patent publication is silent about the construction of the threads in the braid elements. Further, the protective jacket comprises a plurality of reinforcement threads incorporated in the braiding. The patent publication provides no clear disclosure of the manner in which this is done, but the reinforcement threads are not a part of the braid elements.

Patent publication WO 2005/019525 describes a braided, load-bearing rope provided with a lengthy core. The core increases the rope's resistance against squeezing, but the core has no function as a load-bearing element. The load-bearing rope is not surrounded by any protective jacket.

A number of requirements exist with respect to a protective jacket. A protective jacket together with a piece of mooring equipment is used as an example. The protective jacket should be pliable and such that the stiffness or bend radius of the mooring equipment does not increase. The protective jacket should be tight, whereby foreign bodies do not penetrate into the mooring equipment. The protective jacket should exhibit good resistance against filing and rubbing. During use, the mooring equipment may be exposed to a cut from a sharp object. The protective jacket should be constructed in such a manner that the protective jacket provides protection against the cut from most possible angles at which the cut may be directed towards the mooring equipment, and such that the protective jacket does not open. A protective jacket should also be allowed to be provided with reinforcements against cuts. A protective jacket should also be allowed to be provided with a streamline coating, which is termed fairing in the art. Fairing is comprised of protruding, cut threads so as to form floss. This gives the mooring equipment improved properties when pulled through the water.

It is generally known in the art that a number of monofilament fibres are laid in a first direction, for example to the left, to produce a so-called yarn. By so doing, the yarn produced is a twisted multifilament. Several yarns are laid in a second direction to produce a so-called composite bundle or strand. Three strands are laid in the first direction to produce a so-called hawser, then forming a three-strand laid hawser. Several hawsers may be laid in the second direction to produce a cable. It is also known that a four-strand laid hawser is comprised of four strands, in which one strand forms a core, a so-called calf. Further, it is known that e.g. hawsers may be comprised of more than four strands. The above does not constitute a complete disclosure of this field in the art. Examples are also known in which the lay-direction deviates from what is described herein.

A disadvantage of laid ropes is that they may twist during loading. Ropes produced via braiding of yarn, strand or hawser will not twist.

Synthetic textile fibres are produced as monofilaments being, in principle, of endless length. Hereinafter, use of synthetic textile fibres is described, but the skilled person will know how the terms may be used with respect to natural fibres. A textile element is comprised of one or more textile fibres.

Hereinafter, a thread will be used as a common term for one lengthy textile element. In its simplest form, a thread is comprised of one monofilament. Further, a thread may be comprised of two or more monofilaments lying side by side and without being twisted about each other. This will be termed a bundle. Further, a thread may be comprised of two or more monofilaments twisted about each other into, for example, a yarn. Further, a thread may be comprised of a strand, a hawser or a cable, as described above. Further, a thread may be comprised of braided textile elements comprised of a monofilament, a bundle, a yarn, a strand, a hawser or a cable. A thread is further characterized in that the thread exhibits a substantially circular cross-section.

Weaving is characterized in that a group of threads, so-called warp or warp thread, is perpendicular to another group of threads, so-called woof or weft. Braiding is characterized in that the threads are functionally equivalent and are conveyed forward, whilst being cross-laid into a zigzag-pattern, below or above the other threads. A first half of the threads are conveyed spiralling forward in one direction and a second half of the threads are conveyed spiralling forward in a second direction.

The term ribbon implies a lengthy element comprised of a plurality of threads, wherein the threads may be formed in various ways, and wherein the threads may be comprised of various materials. A ribbon may be formed via weaving or via braiding and such that the ribbon in a first direction, height/thickness, is substantially shorter than in a second direction, width, wherein the first direction is perpendicular to the longitudinal direction of the ribbon, and the second direction is perpendicular both to the longitudinal direction of the ribbon and to the first direction. As such, and as an example, the ratio between the first direction, the height, and the second direction, the width, may be 1:3; 1:4; 1:5; 1:10;

1:20. The skilled person will know that this ratio varies with the number of threads in a warp, or the number of threads in a braiding.

A braided ribbon may be produced via braiding of, for example, 12 threads, wherein 6 threads lie side by side in a first direction and 6 threads lie side by side in a second direction. The threads cross each other in particular patterns, such as e.g. over 2-under 2, or over 1-under 1. Other patterns are also available. When a thread, which lies in a first direction, is braided outwards to the edge of the ribbon, it is bent and is braided inwards along the ribbon in the second direction. The minimum number of threads in a ribbon is 3 threads. Ribbons having 4, 5, 6, 7, 8, 9, 10, 11, 12, 13, 14, 15, 16, 32, 64 or 128 threads are known. It is obvious in the art to produce ribbons having a number of threads deviating from this, and it is known that the complexity of the braiding machines increases with the number of threads to be braided into a ribbon.

The object of the invention is to remedy or to reduce at least one of the disadvantages of the prior art, or at least to provide a useful alternative to the prior art.

SUMMARY OF THE INVENTION

The object is achieved by virtue of features disclosed in the following description and in the subsequent claims.

A braided ribbon according to the invention may comprise at least one lengthy, interlaced element extending in the longitudinal direction of the ribbon. The lengthy, interlaced element may be comprised of a thread of the same material used in the threads forming the braiding, or the lengthy, interlaced element may be comprised of another material. The lengthy, interlaced element may be comprised of a fibre, of a polymer or of a metal. The braiding extends around the lengthy, interlaced element. A ribbon having one or more lengthy, interlaced elements will be longer in the first direction, the height/the thickness, than a corresponding braided ribbon without lengthy, interlaced elements.

In a first aspect, the invention concerns a jacket for a lengthy, load-bearing body, wherein the jacket is comprised of a plurality of braid elements which, when braided, enclose at least a portion of the lengthy body, and wherein the braid element is comprised of a braided ribbon.

The braided ribbon may comprise at least 3 threads. In an alternative embodiment, the braided ribbon may comprise 4, 5, 6, 7, 8, 9, 10, 11, 12, 13, 14, 15, 16, 32, 64, or 128 threads. The threads are chosen from a group comprised of a mono-filament, a bundle, a yarn, a strand, a hawser, and a cable. The threads may be comprised of braided textile elements.

Further, the braided ribbon may comprise at least one lengthy, interlaced element. The braided ribbon may comprise a plurality of lengthy, interlaced elements side by side. The lengthy, interlaced element may comprise a textile element. In an alternative embodiment, the lengthy, interlaced element may comprise a metal. In an alternative embodiment, the lengthy, interlaced element may comprise a polymer. The polymer may surround a metal, such as an electric conductor, or a signal conductor, such as an optical fibre. The polymer may be massive, or the polymer may be tubular. The threads of the braided ribbon may surround the lengthy, interlaced element when braided.

The lengthy, load-bearing body, which is surrounded by the jacket in at least one portion, may be chosen from a group comprising a pipe, an electric cable, a mooring element, and a rope. The invention also concerns a lengthy, load-bearing body which may be provided with a jacket, as described hereinbefore. The mooring element may be a mooring rope or a mooring hawser.

In a second aspect, the invention concerns a method of applying a braided jacket onto a lengthy, load-bearing body, wherein the lengthy, load-bearing body is conveyed through a support sheave of a braiding machine and braid elements from spools of the braiding machine are applied, whereby the braid elements form the jacket, and wherein the braid element is formed as a braided ribbon.

BRIEF DESCRIPTION OF THE DRAWINGS

Hereinafter, examples of preferred embodiments are described and are depicted in the accompanying drawings, where.

DETAILED DESCRIPTION

Figure 1:
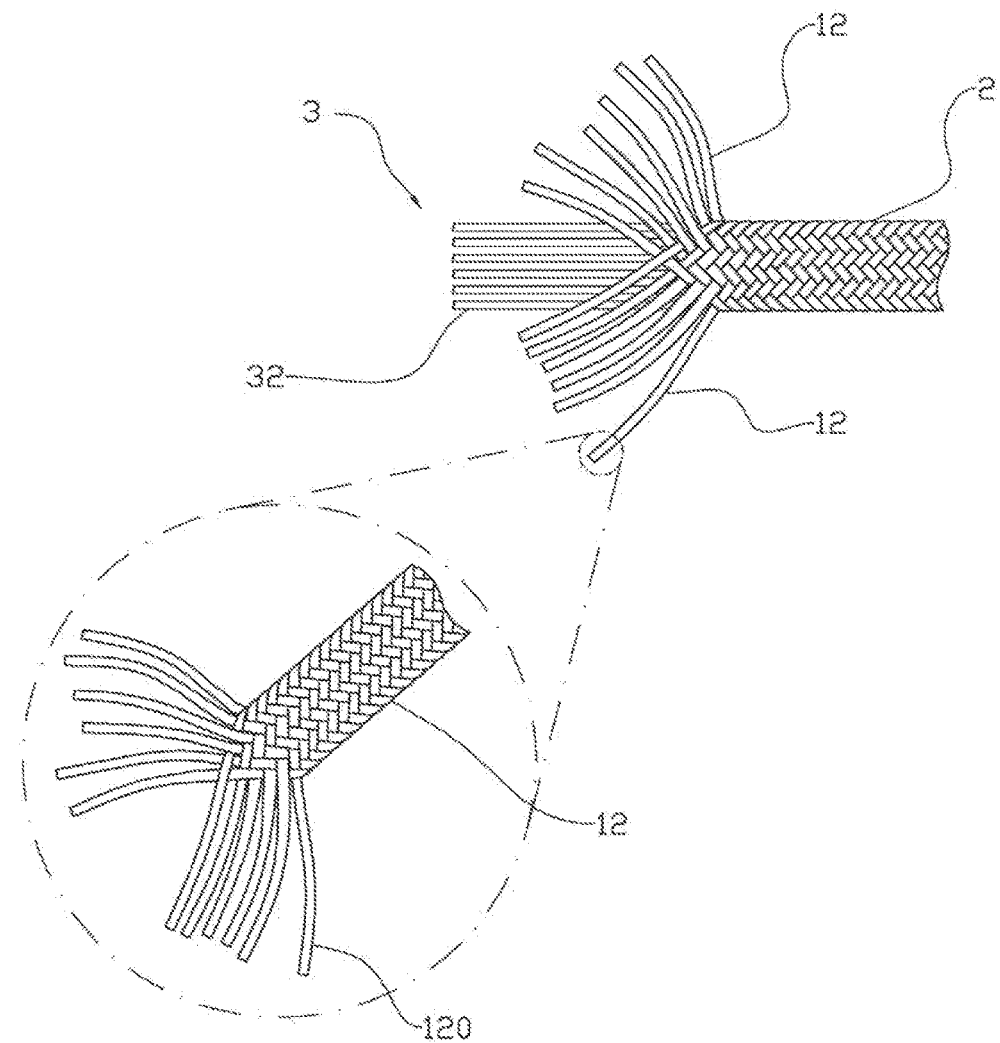
FIG. 1 shows several lengthy bodies surrounded by a braided jacket, wherein the jacket is comprised of a plurality of braid elements, wherein each braid element is comprised of a braided ribbon, as shown in the enlarged detail in the figure.
Figure 2:
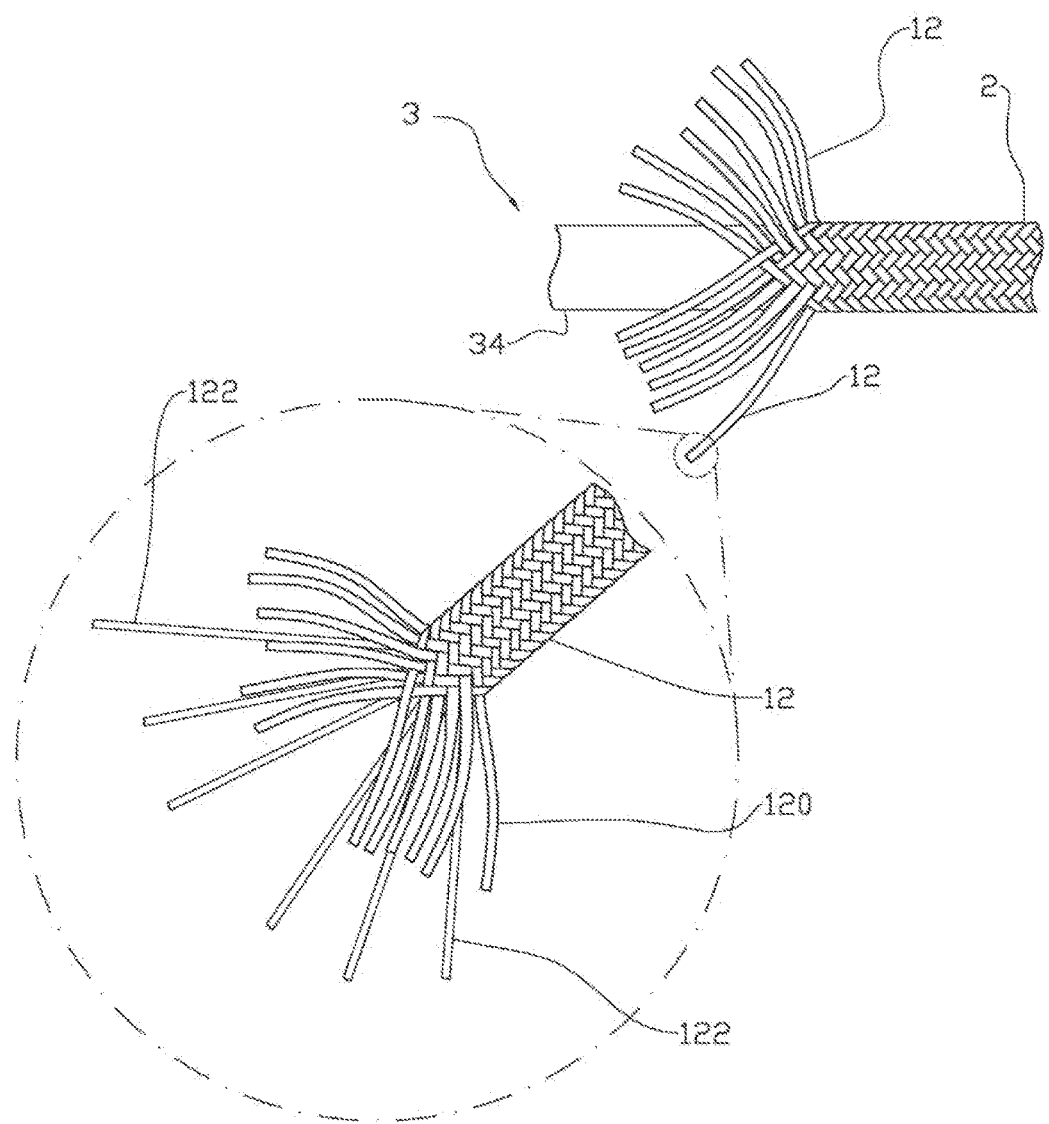
FIG. 2 shows, at the same scale as FIG. 1, one lengthy body being surrounded by a braided jacket, wherein the jacket is comprised of a plurality of braid elements, wherein each braid element comprises a braided ribbon, and wherein the braided ribbon comprises interlaced, lengthy elements, as shown in the enlarged detail in the figure.

In the figures, reference numeral 12 denotes a braided braid element. The braid element 12 is comprised of a braided ribbon. A plurality of braid elements 12 are braided around a lengthy, load-bearing body 3 and form a jacket 2. In FIGS. 1 and 2 it is shown that the jacket 2 is formed by twelve braid elements 12. In FIG. 1, the lengthy, load-bearing body 3 is shown as a plurality of threads 32. The threads 32 may be comprised of textile threads chosen from a group comprising a monofilament, a bundle, a yarn, a strand, a hawser, and a cable. Further, the thread 32 may be comprised of braided textile elements which may be comprised of a mono-filament, a bundle, a yarn, a strand, a hawser or a cable. In an alternative embodiment, the thread 32 may be comprised of a metal thread. A braiding machine of a type known per se is used for the braiding of the jacket 2, the machine of which is not discussed in further detail. The lengthy, load-bearing body 3 is conveyed through a support sheave (not shown) of the braiding machine and braid elements 12 from spools (not shown) of the braiding machine are applied, whereby the braid elements 12 form the jacket 2.

FIG. 2 shows another embodiment, wherein the lengthy body 3 is comprised of one body 34, such as, for example, a hawser, a metal thread, a hose, a stiff pipe or a pliable, electric conductor.

Figure 3:
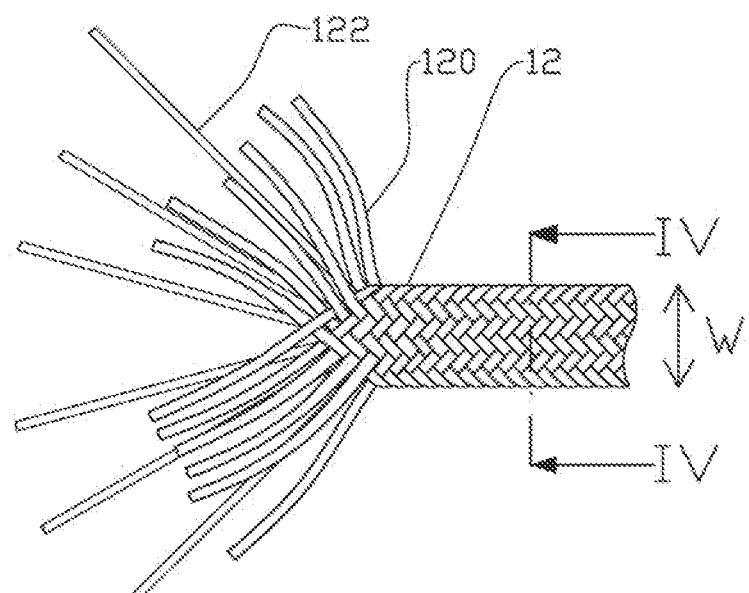
FIG. 3 shows the same detail as shown in FIG. 2, wherein the width of the braid element is depicted with a double arrow.

In FIGS. 1-3, embodiments are shown wherein the braided ribbon 12 is comprised of twelve threads 120. The threads 120 may be textile threads chosen from a group comprising a mono-filament, a bundle, a yarn, a strand, a hawser, and a cable. Further, the threads 120 may be comprised of braided textile elements which may be comprised of a monofilament, a bundle, a yarn, a strand, a hawser, or a cable. In FIGS. 1-3, a braiding pattern denoted as over 2-under 2 is shown. The skilled person will know that other braiding patterns are possible. The braided ribbon 12 is produced in a braiding machine of a type known per se, the machine of which is not discussed in further detail.

In FIG. 2 and FIG. 3, the braided ribbon 12 is shown in an alternative embodiment. The braided ribbon 12 is provided with a plurality of lengthy, interlaced elements 122. In the finished ribbon 12, the interlaced elements 122 lie side by side in the longitudinal direction of the braided ribbon 12. The threads 120 are braided around the interlaced elements 122, as shown schematically in FIGS. 4-9. A double arrow marked "W" denotes the second direction of the braided ribbon 12.

FIGS. 4-9 show an over 2-under 2 braiding around the interlaced elements 122. A double arrow marked "H" denotes the first direction of the braided ribbon 12.

Figure 4:
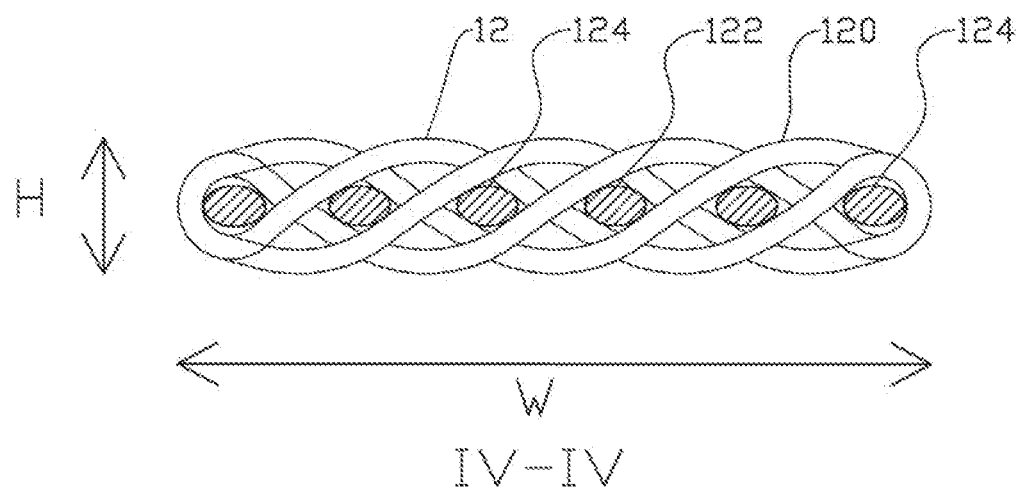
FIG. 4 shows, in larger scale, a section through the braid element shown in FIG. 3, wherein the braid element is provided with interlaced, lengthy elements shown in a first embodiment.

In a first embodiment, the interlaced elements 122 may constitute a reinforcement 124 of the braid element 12 in order to increase the resistance of the braid element 12 against cuts, gnawing and other mechanical damage, as shown in FIG. 4. The interlaced elements 124 may be comprised of a thread. The interlaced elements 124 may be textile threads chosen from a group comprising a monofilament, a bundle, a yarn, a strand, a hawser, and a cable. Further, the interlaced elements 124 may be comprised of braided textile elements which may be comprised of a monofilament, a bundle, a yarn, a strand, a hawser, or a cable. In a further, alternative embodiment, the interlaced elements 124 may be comprised of a metal thread, and in yet a further, alternative embodiment the interlaced elements 124 may be comprised of a metal wire.

Figure 5:
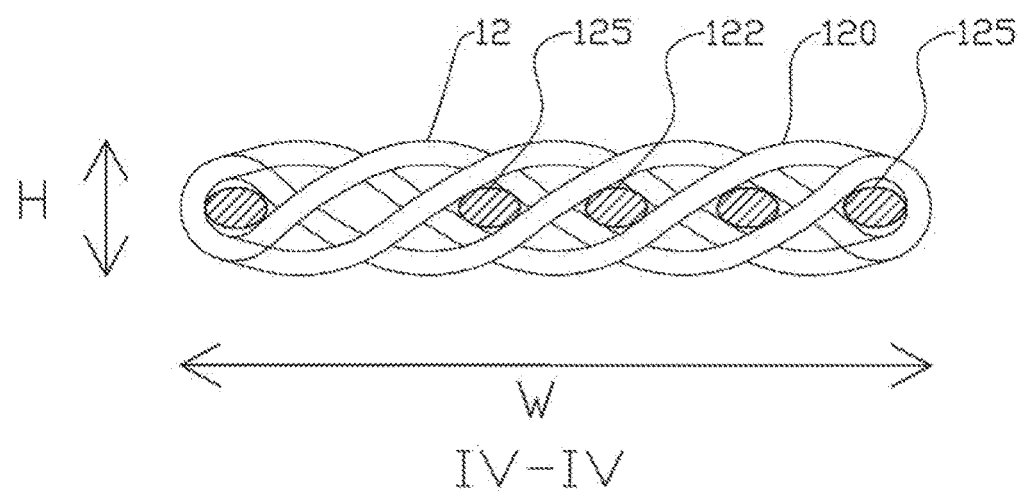
FIG. 5-9 show the same as in FIG. 4, wherein the braid element is provided with interlaced, lengthy elements in alternative embodiments.
Figure 6:
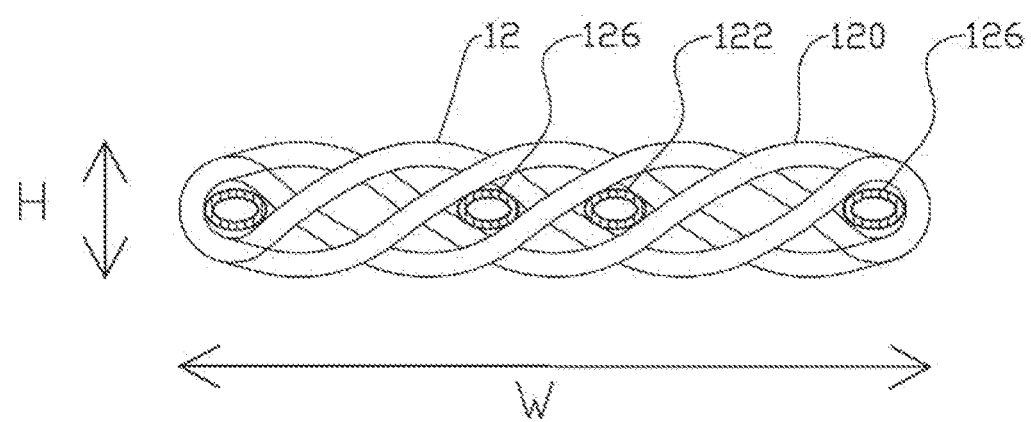

In a second embodiment, the interlaced elements 122 may constitute lengthy, floating elements 125 in the braid element 12, as shown in FIG. 5. The interlaced elements 125 may be comprised of a material having low specific gravity. In an alternative embodiment, the interlaced elements 122 may be comprised of lengthy, tubular floating elements 126, as shown in FIG. 6. In the embodiments shown in FIGS. 5 and 6, the jacket 2 will constitute a buoyant body around the lengthy body 3 when placed in water.

Figure 7:
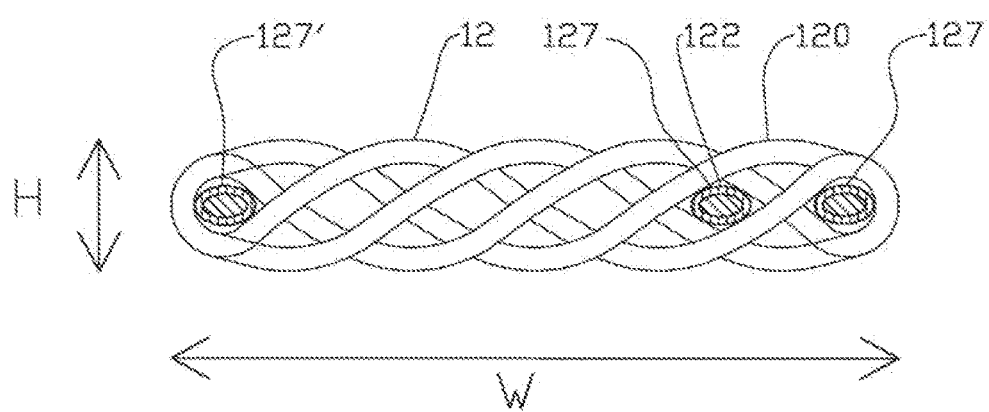

In a third embodiment, the interlaced elements 122 may constitute a lengthy, weight element 127 in the braid element 12, as shown in FIG. 7. The interlaced weight elements 127 may be comprised of a material having high specific gravity. In this embodiment, the jacket 2 will constitute a weight body around the lengthy body 3 when placed in water and will provide the lengthy body 3 with better sinking properties. The interlaced weight elements 127 may be comprised of a metal, for example of lead, or of a metal surrounded by a polymer jacket 127'.

Figure 8:
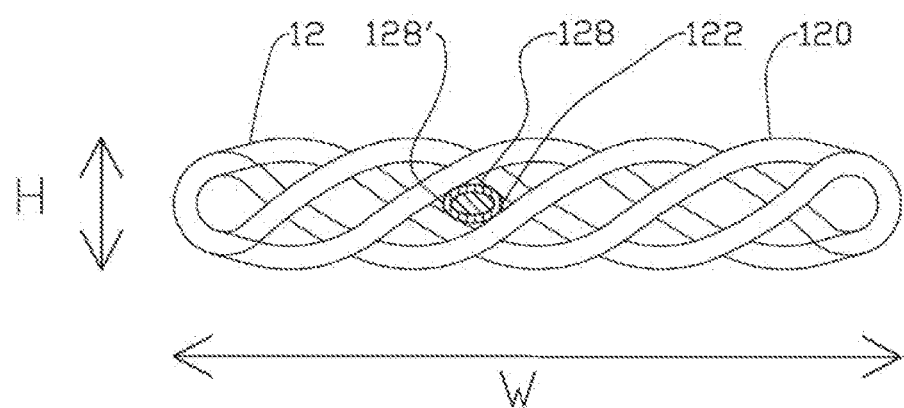

In a fourth embodiment, the interlaced elements 122 may constitute a lengthy, electric conductor 128 in the braid element 12, as shown in FIG. 8. The interlaced electric conductors 128 may be surrounded by an electrically isolating polymer jacket 128'. At least one braid element 12 in the jacket 2 is provided with at least one electric conductor 128. The electric conductor 128 may be a signal cable. The electric conductors 128 may be structured to transmit electric energy from one end portion of the lengthy body 3 and onto another end portion thereof. In an alternative embodiment, the electric conductors 128 may be structured to form an electric field around the lengthy body 3 in order to prevent, for example, sharks from biting into the lengthy body 3.

Figure 9:
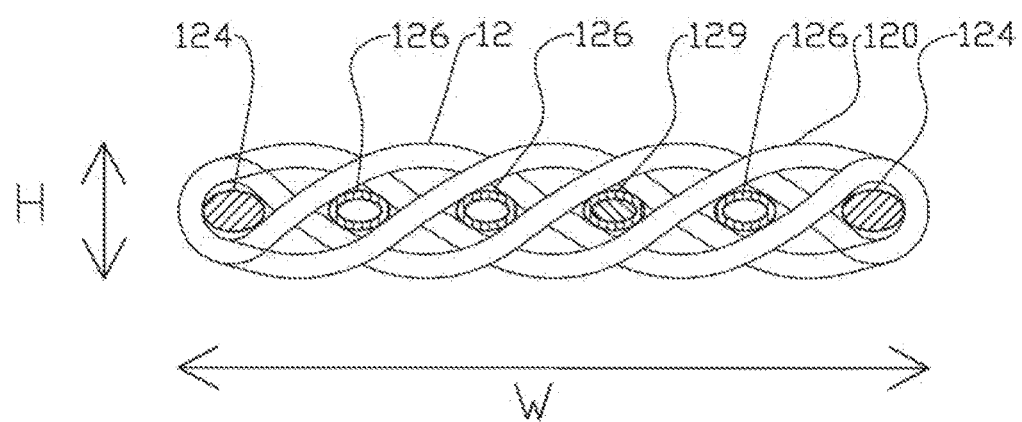

In a fifth embodiment, the interlaced element 122 may constitute a lengthy, signal conductor 129 in the braid element 12, as shown in FIG. 9. The interlaced signal conductor 129 may be comprised of an optical conductor 129. In FIG. 9, one possible combination of various interlaced elements 122 is also shown. One braid element 12 may be provided with at least one reinforcement 124, and at least one floating element 126. The skilled person will also appreciate that the various braid elements 12 forming the jacket 2 may be provided with various interlaced elements 122, or with various combinations of interlaced elements 122.

The threads 32, 120 and the interlaced elements 122 may be comprised of, for example, synthetic fibres, such as polyester, polyamide, polypropylene, polyethylene, including so-called UHMWPE (ultra-high-molecular-weight polyethylene), aramid or vectran. The threads 32, 120 and the interlaced elements 122 may be comprised of the same material, or they may be comprised of various materials.

In alternative embodiments, the lengthy body 3 may comprise a rope or a hawser, a textile thread, a metal thread, a wire, a rope, a hose, or a stiff pipe.

The skilled person will know that other braiding patterns are possible, such as e.g. over 1-under 1. Further, it is known to use another number of braid elements 12 than twelve in order to braid a jacket 2 around a lengthy, load-bearing body 3.

The invention claimed is:

1. A jacket for a lengthy, load-bearing body, wherein the jacket is comprised of a plurality of braid elements which, when braided, enclose at least a portion of the lengthy body, wherein the braid element is comprised of a braided ribbon, and wherein the braided ribbon comprises at least one lengthy, interlaced element.

2. The jacket according to claim 1, wherein the interlaced element extends in a longitudinal direction of the braided ribbon.

3. The jacket according to claim 1, wherein the braided ribbon comprises at least 3 threads.

4. The jacket according to claim 3, wherein the threads are chosen from a group comprised of a monofilament, a bundle, a yarn, a strand, a hawser, and a cable.

5. The jacket according to claim 3, wherein threads consist of braided textile elements.

6. The jacket according to claim 1, wherein the braided ribbon comprises a plurality of lengthy, interlaced elements side by side.

7. The jacket according to claim 1, wherein the lengthy, interlaced element comprises a textile element.

8. The jacket according to claim 1, wherein the lengthy, interlaced element comprises a metal.

9. The jacket according to claim 1, wherein the lengthy, interlaced element comprises a polymer.

10. The jacket according to claim 3, wherein the threads of the braided ribbon surround the lengthy, interlaced element when braided.

11. The jacket according to claim 1, wherein the lengthy, load-bearing body is chosen from a group comprising a pipe, an electric cable, a mooring element, and a rope.

* * * * *